United States Patent [19]

Machida et al.

[11] Patent Number: 4,972,303
[45] Date of Patent: Nov. 20, 1990

[54] AUTOMOBILE LAMP

[75] Inventors: Tsutomu Machida; Toshiyasu Mochizuki; Manabu Maeda, all of Shimizu, Japan

[73] Assignee: Koito Manufacturing Co., Ltd., Tokyo, Japan

[21] Appl. No.: 474,865

[22] Filed: Feb. 5, 1990

[30] Foreign Application Priority Data

Feb. 6, 1989 [JP] Japan .................................. 1-25912

[51] Int. Cl.⁵ ............................................. B60Q 1/00
[52] U.S. Cl. ...................................... 362/80; 362/294;
362/373; 340/479
[58] Field of Search ................ 362/80, 80.1, 340, 311,
362/479, 294; 340/479

[56] References Cited

U.S. PATENT DOCUMENTS

| | | | |
|---|---|---|---|
| 4,733,335 | 3/1988 | Serizawa et al. | 362/80 |
| 4,736,279 | 4/1988 | Yamai et al. | 362/80 |
| 4,744,011 | 5/1988 | Tomita et al. | 362/80 |
| 4,845,600 | 7/1989 | Matsumura et al. | 362/80 |
| 4,862,330 | 8/1989 | Machida et al. | 362/61 |

FOREIGN PATENT DOCUMENTS 160328 7/1986 Japan .
160329 7/1986 Japan .

*Primary Examiner*—James C. Yeung
*Attorney, Agent, or Firm*—Sughrue, Mion, Zinn, Macpeak & Seas

[57] ABSTRACT

An automobile lamp of the type including a light source, a lens member and an inner lens member disposed between the light source and the lens member. A mounting portion is integrally formed on the inner lens member, a stepped portion is formed on the lens member, and an edge of the mounting portion is secured to the stepped portion by ultrasonic welding.

1 Claim, 9 Drawing Sheets

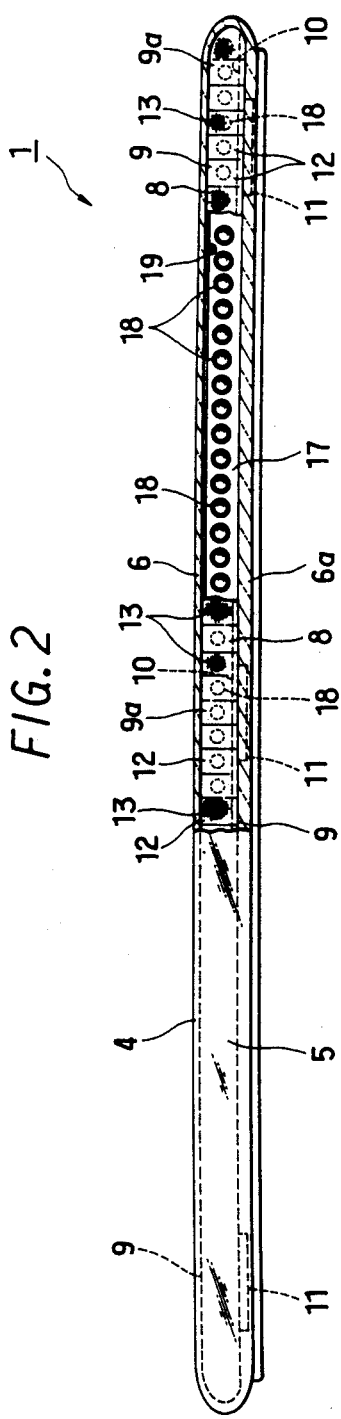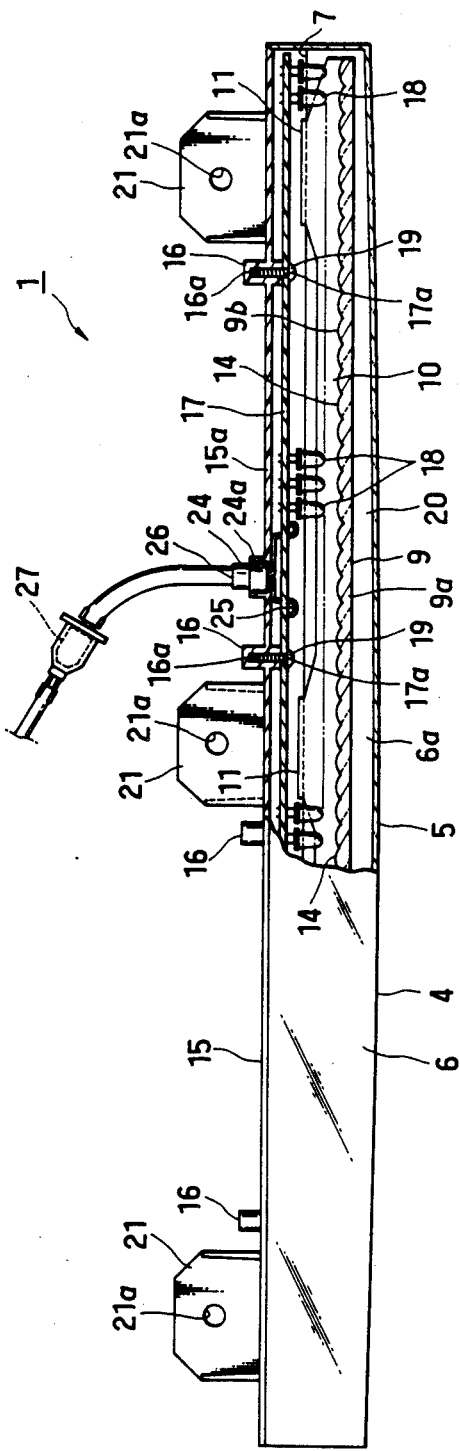
FIG. 2
FIG. 3

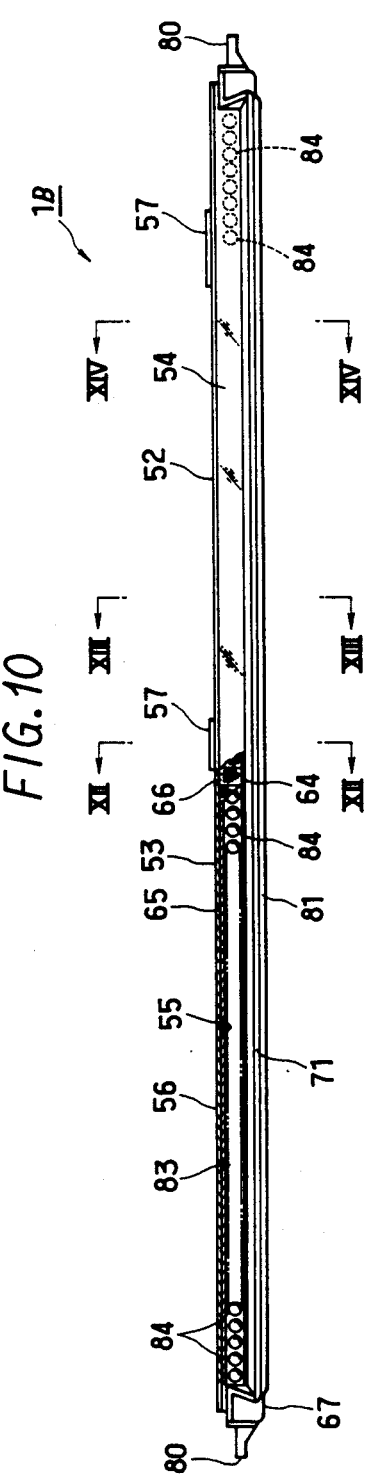
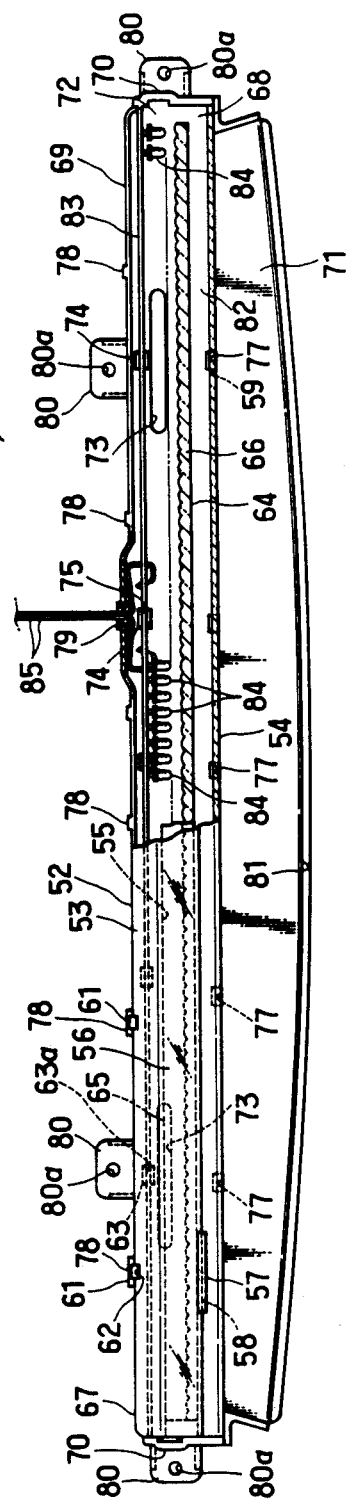
FIG. 10
FIG. 11

AUTOMOBILE LAMP

FIELD OF THE INVENTION

The present invention relates to an automobile lamp particularly adapted for use in an automobile, and of the type including a lens member, a light source, and an inner lens member disposed between the lens member and the light source.

DESCRIPTION OF PRIOR ART

FIG. 15 shows a prior art automobile lamp of the aforesaid type. The lamp a shown in the drawing comprises an upper case member b and a lower case member b' constituting a lens member, a printed circuit board d mounting a plurality light emitting diodes (LED) c, c . . . (only one is shown in the drawing) constituting a light source, and an inner lens member e which is located by and disposed between the upper and lower case members b and b'.

A plurality of clamping pieces f, f, f' and f' are formed integrally on the upper and lower case members b and b' for mounting the light source and the inner lens member e.

Japanese Patent Disclosure (Kokai) No. 63-901 and Japanese Utility Model Disclosure (Kokai) No. 62-149446 show such an automobile lamp as applied to a so-called high mount stop lamp for notifying the driver of following vehicle that the brakes of the vehicle have been applied.

In the lamp a of FIG. 15, there are shortcomings such that the clamping pieces f, f, f' and f' formed on the upper and lower case members b and b' act to intercept the light emitted from the LED as shown in hatched lines, and the effective portion of the inner lens member e is limited to the range l as shown in the drawing. It is required for increasing the effective range to increase the distance between the upper and lower case members b and b', which inevitably increases the size of the lamp a of the thickness direction, whereby the lamp a becomes bulky.

It has been suggested to omit the clamping pieces f, f, f' and f' and to simply clamp the inner lens member e between the upper and lower case members b and b', but it is difficult to locate the inner lens member e and it is excessively troublesome and time consuming to perform the mounting operations.

An object of the invention is to provide a signal lamp of an automobile lamp which overcomes the above described shortcomings.

SUMMARY OF THE INVENTION

According to the invention, there is provided an automobile lamp including a light source, a lens member and an inner lens member interposed between the light source and the lens member, wherein a mounting portion is integrally formed on the inner lens member, a stepped portion is formed on the lens member, and an edge of the mounting portion is secured to the stepped portion by ultrasonic welding.

BRIEF DESCRIPTION OF THE DRAWINGS

Further objects and effects of the invention will become apparent from the following detailed description in conjunction with the drawings, in which:

FIG. 2 is a partially broken front view of the lamp of FIG. 1;

FIG. 3 is a partially broken plan view of the automobile lamp of FIG. 1;

FIG. 10 is a view similar to FIG. 2 but showing a third embodiment of the present invention;

FIG. 11 is a partially broken plan view of the automobile lamp of FIG. 10;

DETAILED DESCRIPTION OF PREFERRED EMBODIMENTS

FIRST EMBODIMENT

Figure 1:
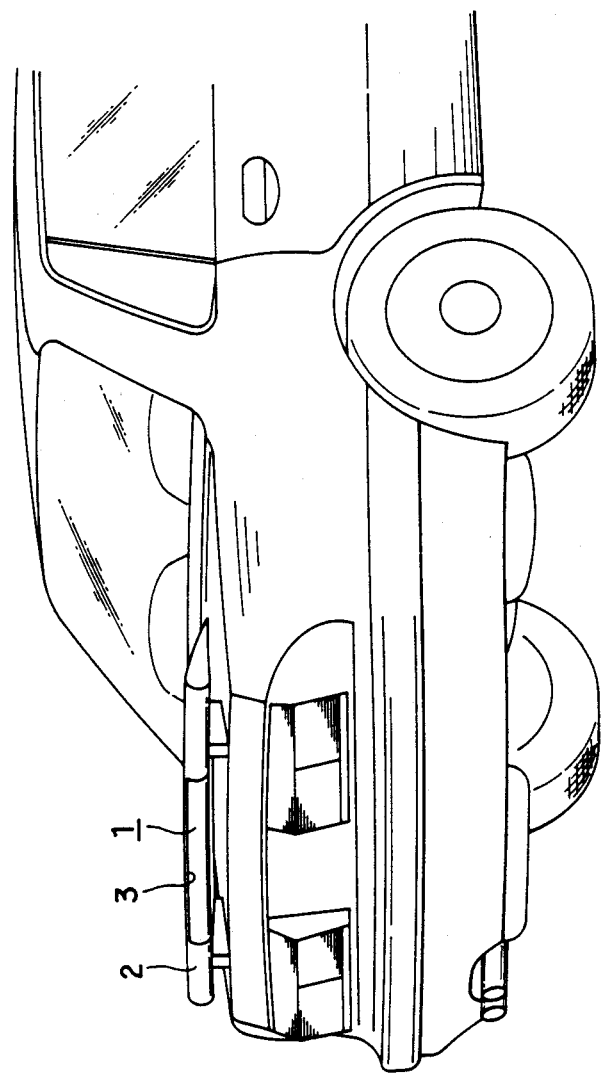
FIG. 1 is a perspective view of an automobile lamp according to a first embodiment of the present invention as mounted on a rear spoiler of an automobile.

An automobile lamp 1 according to a first embodiment of the present invention is shown in FIG. 1 through FIG. 6 and, which is a stop lamp mounted on a rear spoiler 2 of an automobile. The rear spoiler 2 is formed to have in the rear end a cutout 3 elongated in the left and right directions and opening in the rear and lower directions for mounting therein the lamp 1.

Lens Member and Inner Lens Member

The lamp 1 comprises a lens member 4, a light source and an inner lens member 8. The lens member 4 is die-formed of a transparent colored thermoplastic synthetic resin material. Since the lamp 1 acts as a stop lamp the lens member 4 is red colored. The main function of the lens member 4 is of a color filter.

The lens member 4 has a front surface portion 5 and peripheral wall portions 6 integrally formed with the front surface portion 5 and extending therefrom in the rear direction. It will be understood that the front and rear directions with respect to the lamp 1 is opposite to that of the automobile, or the front of the lamp 1 is the rear direction of the vehicle.

Figure 4:
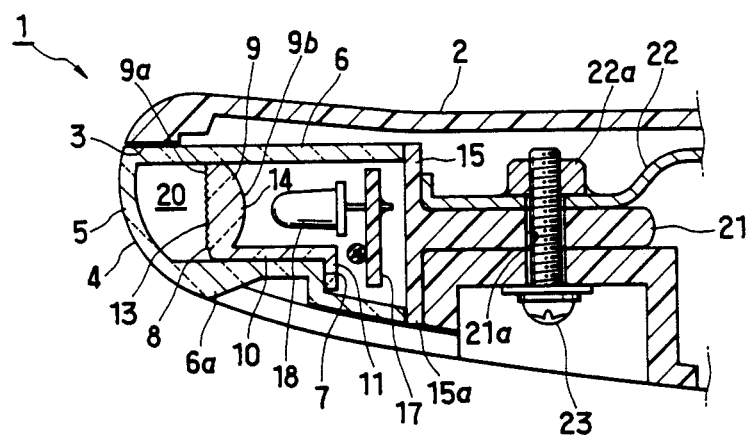
FIG. 4 is an enlarged sectional view of the lamp of FIG. 1 taken generally along fore and aft directions.

The bottom portion 6a of the peripheral wall portion 6 has a thick thickness adjacent to the front surface portion 5, and the thickness is gradually reduced going away from the front end as shown in FIG. 4, and a rearward facing step 7 is formed thereon.

The inner lens member 8 is formed of a transparent noncolored thermoplastic synthetic resin material and has a lens portion 9 and a leg portion 10 integrally formed with the lens portion 9 and projecting rearward from the lower end of the lens portion 9. A plurality of bent portions 11, 11 and 11 are formed on the rear end of the leg portion 10 to extend downward.

On the front surface 9a of the lens portion 9 there are provided recessed light diffusing steps 13, 13 . . . being partitioned into minute lattice-like form in respective generally rectangular domains 12, 12 . . . , and on the rear surface 9b of the lens portion 9 there are provided lens elements 14, 14 . . . of convex lens form in respective domains 12, 12 . . . .

The inner lens member 8 is mounted in the lens member 4 with the bent portions 11, 11 and 11 of the leg portion 10 being located and secured to the step 7 on the lens member 4 through ultrasonic welding. Thus, the inner lens member 8 is located and secured to the lens member 4 with the leg portion 10 abutting with the inner surface of the bottom portion 6a of the lens member 4.

Housing and Printed Circuit Board

Shown at numeral 15 is a housing formed of an opaque synthetic resin material and which has a plurality of boss portions 16, 16 . . . formed on a base portion 15a thereof which extends in left and right directions.

Shown at numeral 17 is a printed circuit board having a plate-like form elongated in left and right directions and having a reduced width in the vertical directions. The printed circuit board 17 has on the front surface a plurality of Leds 18, 18 . . . as shown in FIGS. 2 and 3, and is mounted on and secured to the base portion 15a of the housing 15 by mounting screws 19, 19 . . . which extend respectively through openings 17a, 17a . . . formed in the circuit board 17 and are screwed into respective screw-threaded openings 16a, 16a . . . in the boss portions 16, 16 . . . of the housing 15. The peripheral portion of the base portion 15a of the housing 15 and the rear end of the peripheral wall 6 of the lens member 4 are connected together by ultrasonic welding or the like, whereby the printed circuit board 17 and LED 18, 18 . . . are disposed and located in a space 20 which is defined between the lens member 4 and the housing 15, with respective Leds 18, 18 . . . being located to oppose respective ones of the lens elements 14, 14 . . . of the lens member 8.

Shown at numerals 21, 21 and 21 are mounting pieces formed integrally on the housing 15 to project rearward from the rear surface of the housing 15 and spaced in the left and which right directions, and have respective, as shown in FIG. 3, mounting openings 21a, 21a and 21a. As shown in FIG. 4, the lamp 1 is mounted in the cutout 3 of the rear spoiler 2 by mounting screws 23, 23 and 23 (only one is shown in the drawing) which pass through mounting openings 21a, 21a and 21a and are screwed into and are secured to nuts 22a, 22a and 22a which are welded to a bracket 22 of the rear spoiler 2.

Other Members

Figure 5:
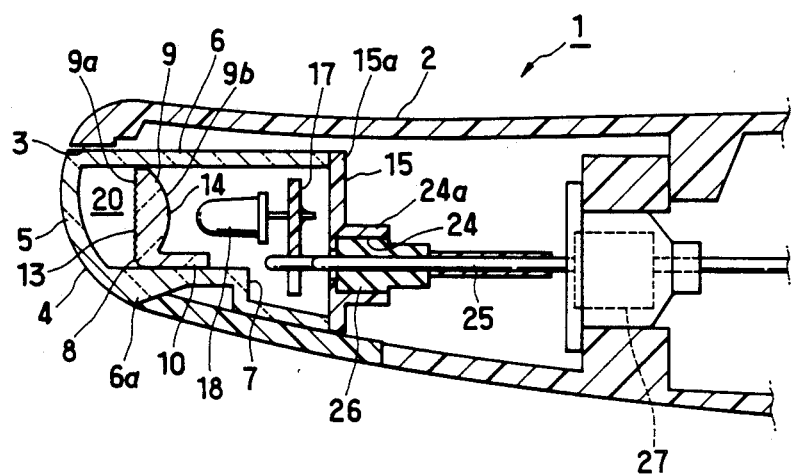
FIG. 5 is a view similar to FIG. 4 but showing another portion.
Figure 6:
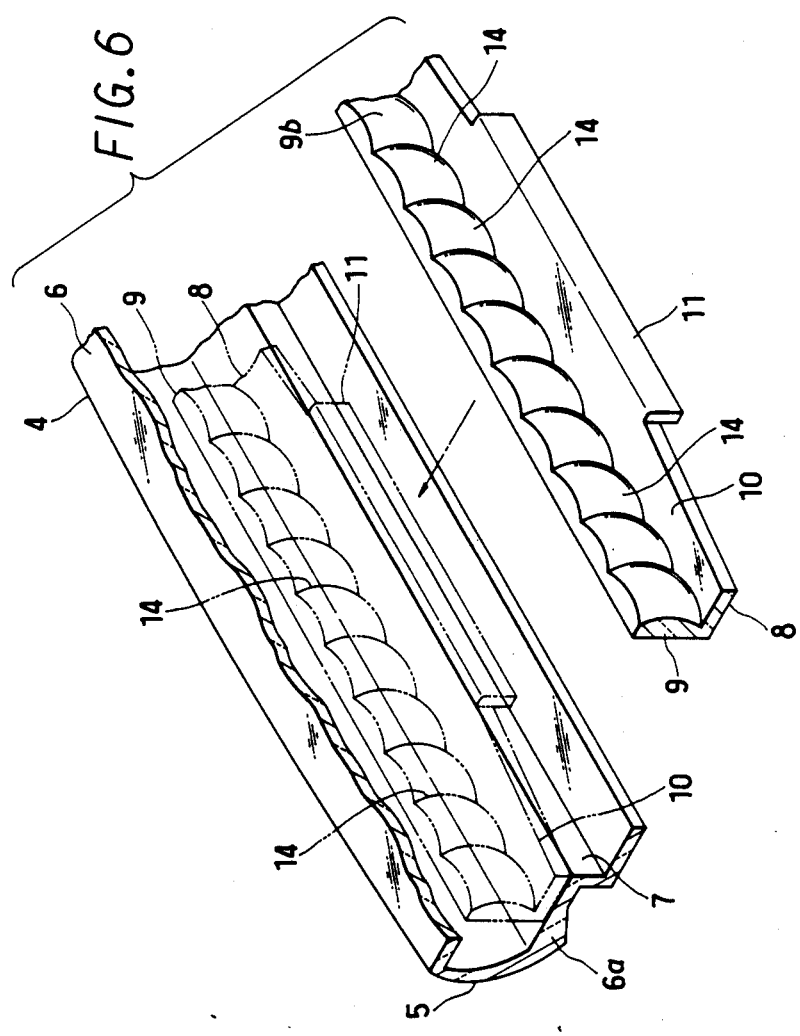
FIG. 6 is a perspective view showing essential portions of an inner lens member and a lens member of the lamp of FIG. 1.

Shown at numeral 24 in FIGS. 3 and 5 is an outlet hole for the electric wires which is formed in the rear surface of the housing 15. A cylindrical peripheral wall 24a is formed to surround the hole 24 and to project rearward.

Shown at numeral 25 is twin electric cords with one end being connected to printed conductors (not shown) on the printed circuit board 17, and the other end passing through a rubber bush 26 to extend outside of the space 20 and being connected through a connector 27 to cords of a lamp exciting circuit (not shown). The rubber bush 26 is secured to the peripheral wall 24a of the outlet hole 24 by a bonding agent which acts to seal the space 20 hermetically from the outside atmosphere. A rubber cover is provided around the connector 27 and, as shown in FIG. 5, a flange portion formed on one end of the rubber cover abuts with an end surface of a mounting portion of the rear spoiler 2.

Function

In the stop lamp 1, there is provided a leg portion 10 integrally on the inner lens member 8, with bent pieces 11, 11 and 11 being formed on the rear end of the leg portion 10 and being secured to a stepped portion 7 on the lens member 4 by ultrasonic welding so as to secure the inner lens member 8 in the recessed portion of the lens member 4. Thus, it is possible to reduce the ineffective portion of the light emitted from the Leds to the minimum, and to utilize effectively the part of the lens portion 9, whereby the thickness of the lamp 1 can be reduced substantially.

SECOND EMBODIMENT

Figure 7:
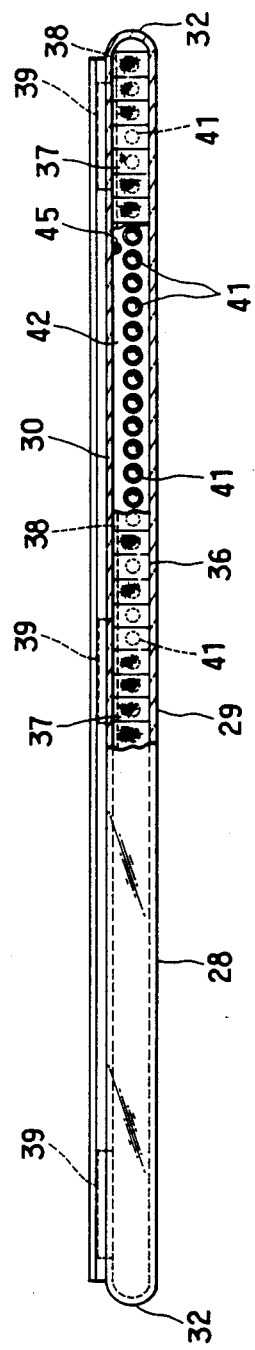
FIG. 7 is a view similar to FIG. 2 but showing a second embodiment of the present invention.
Figure 8:
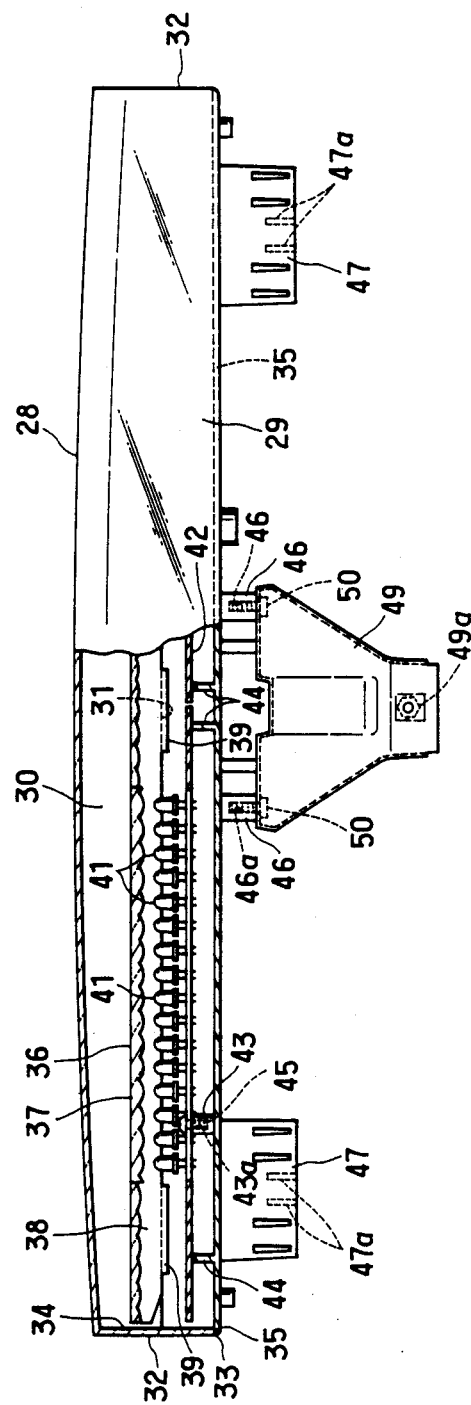
FIG. 8 is a partially broken bottom view of the lamp of FIG. 7.
Figure 9:
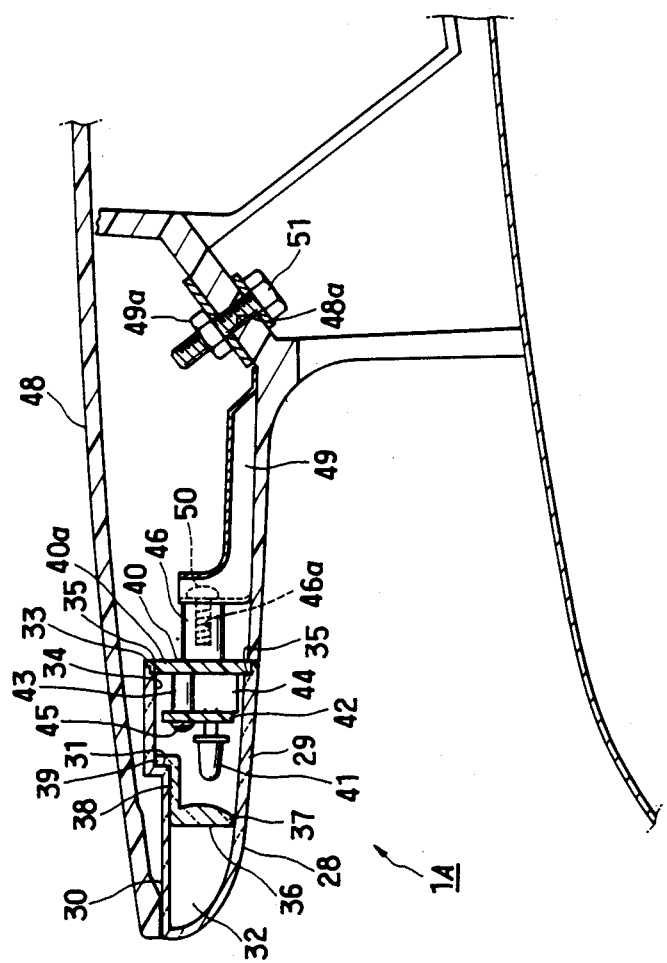
FIG. 9 is a sectional view of the lamp of FIG. 7 as mounted on a rear spoiler of an automobile.

FIGS. 7, 8 and 9 show a stop lamp 1A mounted on a rear spoiler 48 of an automobile, the stop lamp 1A being constructed according to the second embodiment of the present invention.

Lens Member, Inner Lens Member

A lens member 28 is formed of a colored transparent synthetic resin material with a bottom surface portion 29 being curved gradually upward toward the forward end, and the front end of the bottom surface portion 29 being connected to the top surface portion 30. Rearward facing step 31 is formed on the top surface portion 30 at the intermediate portion in the fore and aft directions. The step 31 extends in the left and right directions.

On the left and right ends of the lens member 28 there are formed side wall portions 32 and 32 which connect together the bottom surface portion 29 and the top surface portion 30 and have outwardly convex forms in the front view.

The rear ends of the bottom surface portion 29, the top surface portion 30 and the side wall portions 32 and 32 are located in a common plane to define an opening edge 33 and to define a recessed portion 34 therein. A stepped portion 35 is formed in the opening edge 33 as shown in FIG. 9 for fitting the peripheral portion of a housing 40 which will be explained hereinafter.

Shown at numeral 36 is an inner lens member which is formed of a transparent thermoplastic synthetic resin material, and includes a lens portion 37 and a mounting portion 38. Similar to the inner lens member 8 of the first embodiment, there are formed on the entire surface of the inner lens member 37 lattice-like partitioned recessed light diffusing steps in the front surface, and a plurality of lens elements aligned and spaced in left and right directions on the rear surface.

The mounting portion 38 extends in the rear direction from the upper end of the lens portion 37 and there are formed on the rear end thereof a plurality of upward bent pieces 39, 39 . . . which are secured to the stepped portion 31 of the lens member 28 by ultrasonic welding and the like, whereby the inner lens member 36 and the lens member 28 are secured together reliably.

Housing, Printed Circuit Board

Shown at numeral 40 is a housing formed of a synthetic resin material, and which has on the front surface of a base portion 40a boss portions 43 and 43 for mounting printed circuit boards 42 and 42, and retaining ridges 44, 44 . . . which extend respectively in the vertical directions. The printed circuit boards 42 and 42 have a plurality of Leds 41, 41 . . . thereon which are equally spaced in left and right directions. The printed circuit boards 42 and 42 are mounted on the boss portions 43 and 43 of the housing 40 by inserting mounting screws 45 and 45 into openings (not shown) in the printed circuit boards 42 and 42 and screwing them into threaded holes 43a and 43a in the boss portions 43 and 43 of the housing 40. Further, the portions near to opposite ends in the left and right directions of the printed circuit boards 42 and 42 are abutting with and supported by respective front surfaces of respective ones of the retaining ridges 44, 44 . . . .

Shown at numerals 46 and 46 are boss portions formed on the rear surfaces of the housing 40 and which have respective threaded holes 46a and 46a as shown in FIGS. 8 and 9.

Shown at 47 and 47 are projecting pieces formed on the housing 40 at locations near to the opposite ends and to project rearward. A plurality of projections or ridges 47a, 47a . . . are formed on the upper surfaces of the projecting pieces 47 and 47 for engaging with resilient retaining pieces (not shown) formed on the rear spoiler 48 for reliably retaining the lamp 1A.

Other Members

Shown at 49 is a bracket formed on the rear spoiler 48 and vertical walls of the front ends thereof are formed to have openings (not shown) corresponding to the boss portions 46 and 46 of the housing 40 so that the housing 40 is secured to the bracket 49 by inserting mounting screws 50 and 50 through the openings and screwed into the threaded holes 46a and 46a in the boss portions 46 and 46 of the housing 40. Further, a nut 49a is welded to the rear end of the bracket 49 and, as shown in FIG. 9 a bolt 51 is inserted through openings 48a formed in a central leg portion of the rear spoiler 48 and in the rear end portion of the bracket 49 and is screwed into a nut 49a, whereby the stop lamp 1A is mounted on the rear spoiler 48.

The printed conductor on the printed circuit board is connected through electric cords and connectors with output terminals of lamp actuating circuit (not shown). An outlet opening from the housing 40, and the seal for the outlet opening are similar to those of the first embodiment, and a further description therefor is omitted.

THIRD EMBODIMENT

FIGS. 10–14 show a stop lamp 1B mounted on a package tray in the rear portion of an automobile according to the third embodiment of the present invention.

Lens Member

Shown at numeral 52 is a lens member die-formed of a colored transparent synthetic resin material.

The lens member 52 is elongated in the left and right directions and, consists of a top plate portion 53 and a front surface portion integrally formed with the top plate portion 53 and depending generally downward from the front end of the top plate portion 53.

The top plate portion 53 is bent upward at the central portion in a further for and aft directions such that a recess 55 is defined inside or in the lower surface to extend in left and right directions and a projection or ridge 56 is defined on the outside to extend in left and right directions. The projection 56 has a plurality of spaced bent roof portions 57, 57 and 57 extending forward from the upper end of the projection 56 so that the upper surface of the top plate portion 53, the front surface of the projection 56 and the lower surfaces of the bent roof portions 57, 57 and 57 cooperate to define engaging grooves 58, 58 and 58 which open forward respectively.

Shown at 60, 60 . . . are engaging pawls spaced in left and right directions and projecting downward from the lower end of the front surface portion 54, and having on the front surfaces respective pawl members 59, 59 . . . .

Figure 12:
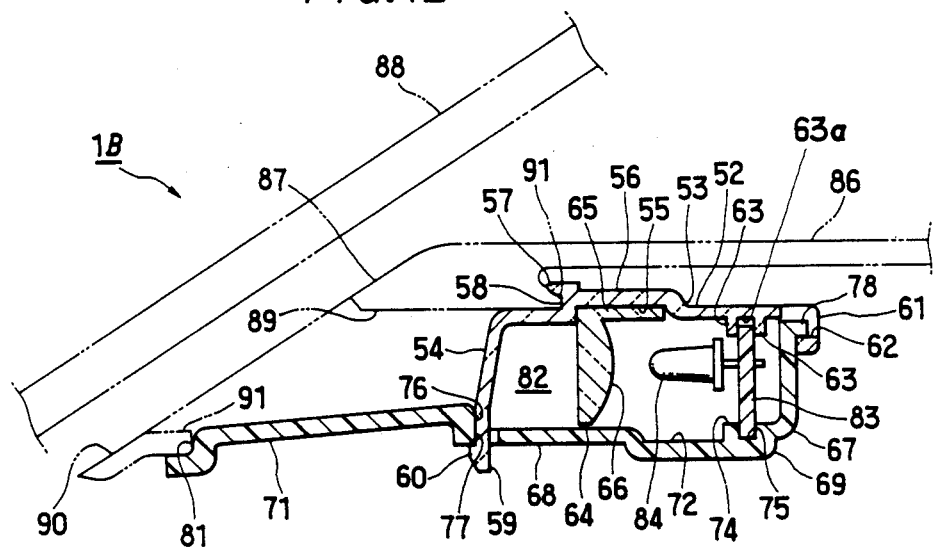
FIG. 12 is an enlarged sectional view taken generally along line XII—XII in FIG. 10.

Shown at numerals 61, 61 . . . are receiving pieces being formed integrally on the rear end of the top plate portion 53 to project downward in a spaced relationship in left and right directions, and have respective openings 62, 62 . . . as shown in FIGS. 11 and 12.

Shown at numerals 63, 63 . . . are projections formed on the inner surface of the top plate portion 53 and at the locations between the recessed portion 55 and the rear end in a suitably spaced relationship in left and right directions. Downward opening grooves 63a, 63a . . . are formed in respective ones of the projections 63, 63 . . . as shown in FIGS. 11 and 12.

Inner Lens Member

An inner lens member 64 has a generally inverted L-shaped configuration in the side view consisting of a mounting portion 65 and a lens portion 66 integrally.

The width of the mounting portion 65 formed in fore and aft directions corresponds to that of the recessed portion 55 in the top plate portion 53 of the lens member 52, so that the inner lens member 64 is secured to the lens member 52 by fitting the mounting portion 65 in recessed portion 55 and welded them together by ultrasonic welding.

The constitution of the lens portion 66 is similar to the lens portion 9 or 37 of the first or the second embodiment, and a further description is omitted.

Body Member

Shown at numeral 67 is a body member die-formed of an opaque synthetic resin material.

The body member 67 has an elongated form in left and right directions, and consists integrally of a bottom plate portion 68, a rear plate portion 69 extending from the rear end of the bottom plate portion 68 in the upper direction, side plate portions 70 and 70 connected to the opposite ends of the bottom plate portion 68 and the rear plate portion 69 in the left and right directions integrally, and an extending portion 71 extending from the front edge of the bottom plate portion 68.

Figure 14:
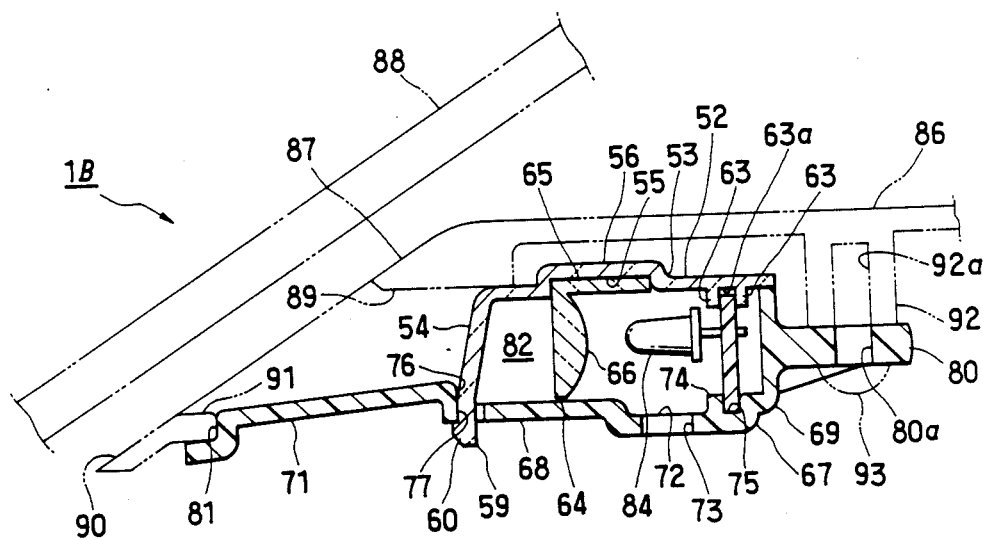
FIG. 14 is an enlarged sectional view taken generally along line XIV—XIV in FIG. 10.
Figure 15:
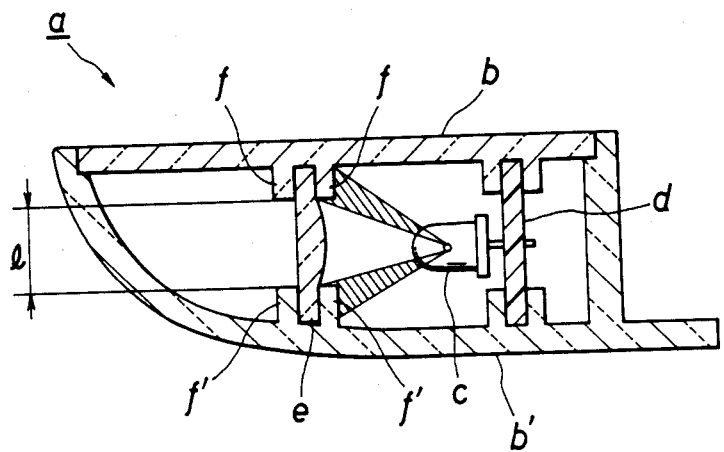
FIG. 15 is a sectional view showing a typical prior art automobile lamp.

The bottom plate portion 68 has a stepped form in the side view to define a recessed portion 72 in the rear half. Heat dissipating openings 73 and 73 are formed in the bottom plate portion 68 as shown in FIGS. 11 and 14.

There are formed projections 74, 74 . . . in the recessed portion 72 and near to the rear plate portion 69, in a spaced relationship in left and right directions, for defining supporting grooves 75, 75 . . . in cooperation with the rear plate portion 69.

Rearward facing step 76 is formed between the bottom plate portion 68 and the extending portion 71, and there are formed engaging openings 77, 77 . . . corresponding to the engaging pawls 59, 59 . . . of the lens member 52 in the front edge of the bottom plate portion 68.

There are formed pawl members 78, 78 . . . on the upper edge of the rear plate portion 69 corresponding to the engaging openings 62, 62 . . . of the lens member 52.

An outlet opening 79 is formed in the central portion of the rear plate portion 69 for passing electric cables.

As shown in FIGS. 11 and 14, there are formed mounting pieces 80, 80 . . . projecting rearward from the rear plate portion 69 and outward from side plate portions 70 and 70, and mounting openings 80a, 80a . . . are formed in respective ones of the mounting pieces 80, 80 . . . .

The front edge of the extending portion 71 is curved in the plan view as shown in FIG. 11 such that the center portion projects forward as compared with opposite side portions, and is bent into a crank form in the sectional view to define on the upper surface an engaging step 81.

In assembling the body member 67 with the lens member 52 having the inner lens member 64, the lens member 52 is firstly located above the body member 67, with the engaging pawls 59, 59 . . . of the lens member 52 aligning with the engaging openings 77, 77 . . . in the body member 67, the pawl members 78, 78 . . . of the body member 67 aligning with the openings 62, 62 . . . in the lens member 52. Under that condition, the lens member 52 is pushed downward against the body member 67 so that the lower ends of the engaging pawls 59, 59 . . . of the lens member 52 deflect rearward, the receiving pieces 61, 61 . . . of the lens member 52 deflect rearward and the upper end of the rear plate portion 69 of the body member 67 deflects forward. Thus, the lower ends of the engaging pawls 59, 59 . . . of the lens member 52 pass through the engaging openings 77, 77 . . . in the body member 67 with the pawls 60, 60 . . . engaging with front lower edges of the openings 77, 77 . . . , and the pawl members 78, 78 . . . of the body member 67 engaging with the lower edges of the openings 62, 62 . . . of the lens member 52, whereby the body member 67 and the lens member 52 are connected reliably and define therebetween a space 82 elongated in the left and right directions.

Printed Circuit Board

A printed circuit board 83 being elongated in the left and right directions, and a plurality of Leds 84, 84 . . . are mounted on the front surface.

The printed circuit board 83 is mounted in the space 82 being defined between the body member 67 and the lens member 52, with the lower edge fitting with and retained by supporting grooves 75, 75 . . . in the body member 67, the upper edge of the printed circuit board 83 fitting with and being retained by grooves 63a, 63a . . . in the lens member 52. Thus, the printed circuit board 83 is clamped between the bottom plate portion 68 of the body member 67 and the top plate portion 53 of the lens member 52.

Shown at 85 and 85 are electric cords having first ends connected to respective printed conductors of the printed circuit board, and the other ends passing through a bush mounted in an outlet opening 79 in the body member 67 to extend outside where they are connected to a connector (not shown in the drawings).

Mounting

Figure 13:
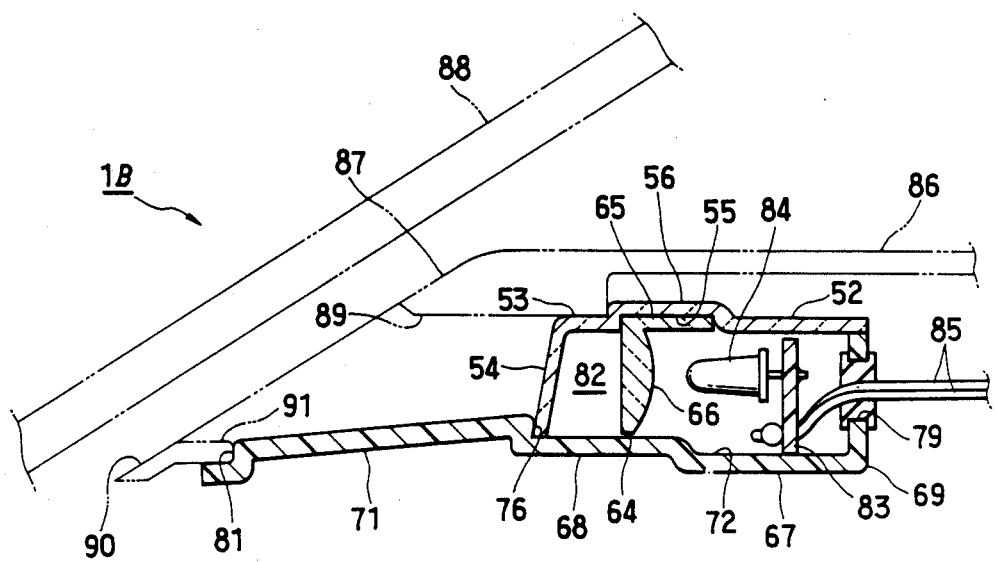
FIG. 13 is an enlarged sectional view taken generally along line XIII—XIII in FIG. 10.

Shown at numeral 86 in FIGS. 12, 13 and 14 is a package tray mounted behind the rear seat of the automobile.

The rear surface 87 of the package tray 86 is located to face the inner surface of a rear window 88 of the automobile, and has therein a window 89 elongated in left and right directions. The tray 86 further has a projecting edge 90 projecting inside (relative to the vehicle) from the lower edge of the window 89, and inner projecting pieces 91, 91 and 91 at locations spaced from the upper edge of the window 89.

Shown at 92, 92 . . . (only one is shown in FIG. 14) are boss seats formed on the inner surface of the package tray 86 to depend therefrom and having respective screw-threaded holes 92a, 92a . . . opening in the lower surface.

In mounting the stop lamp 1B on the package tray 86, the engaging grooves 58, 58 and 58 formed in the top plate portion 53 of the lens member 52 are engaged with respective ones of the projecting pieces 91, 91 and 91 of the tray 86, the engaging step 81 formed on the front end portion of the extending portion 71 of the body member 67 is engaged with the inner end of the projecting edge 90 on the rear surface portion 87 of the package tray 86, whereby the mounting pieces 80, 80 . . . of the stop lamp 1B abut with the lower surfaces of the boss seats 92, 92 . . . of the package tray 86 with the mounting openings 80a, 80a . . . in the mounting pieces 80, 80 . . . aligning with the threaded holes 92a, 92a . . . in the boss seats 92, 92 . . . .

Thus, the stop lamp 1B is mounted on the package tray 86 by inserting mounting screws 93, 93 . . . through mounting openings 80a, 80a . . . in the mounting pieces 80, 80 . . . and screwing them into the threaded holes 92a, 92a . . . in the boss seats 92, 92 . . . .

Thereafter, the package tray 86 is mounted in the rear portion of the vehicle.

ADVANTAGES OF THE INVENTION

As described heretofore, according to the first and second embodiments of the invention, an automobile lamp of the type including a light source, a lens member and an inner lens member interposed between the light source and the lens member has been disclosed and, in which, a mounting portion is integrally formed on the inner lens member, a stepped portion is formed on the lens member, and an edge of the mounting portion is secured to the stepped portion on the lens member by ultrasonic welding.

According to the third embodiment of the invention, in the automobile lamp of above mentioned type, a mounting portion is integrally formed on the inner lens member, a recessed portion is formed in the lens member, and the mounting portion of the inner lens member is received in the recessed portion and is secured to the inner lens member by ultrasonic welding.

Therefore, according to the invention, it is possible to omit clamping pieces and the like utilized in prior art devices while increasing the effective range of the LED light without increasing the thickness of the lamp. Further, it is not required to locate accurately the inner lens member in the lamp space which enables a substantial reduction in the amount of time required in the assembling operation.

It will be understood that the embodiments described as above do not limit the invention and various changes or modifications can easily be applied by those skilled in the art.

What is claimed:

1. An automobile lamp comprising:
a light source an outer lens member and an inner lens member interposed between said light source and said outer lens member, said inner lens member having a mounting portion formed integrally therewith, a stepped portion being formed on said outer lens member, an edge of said mounting portion of said inner lens member being secured to said stepped portion by ultrasonic welding, said inner lens member having a generally L-shaped section and comprising a leg portion and a lens portion, said leg portion being secured to said outer lens member by ultrasonic welding, and said leg portion being received in a recessed portion formed in said outer lens member.

* * * * *